US010855723B2

(12) United States Patent
Kupisiewicz (10) Patent No.: US 10,855,723 B2
(45) Date of Patent: Dec. 1, 2020

(54) ENFORCING A SECURE TRANSPORT PROTOCOL WITH DYNAMICALLY UPDATED STORED DATA (71) Applicant: Cisco Technology, Inc., San Jose, CA (US)

(72) Inventor: Piotr Jerzy Kupisiewicz, Cracow (PL)

(73) Assignee: CISCO TECHNOLOGY, INC., San Jose, CA (US)

(*) Notice: Subject to any disclaimer, the term of this patent is extended or adjusted under 35 U.S.C. 154(b) by 243 days.

(21) Appl. No.: 15/977,726

(22) Filed: May 11, 2018

(65) Prior Publication Data
US 2019/0349401 A1 Nov. 14, 2019

(51) Int. Cl.
H04L 29/06 (2006.01)
H04L 29/12 (2006.01)
G06F 16/23 (2019.01)
G06F 16/903 (2019.01)

(52) U.S. Cl.
CPC ............ *H04L 63/166* (2013.01); *G06F 16/23* (2019.01); *G06F 16/903* (2019.01); *H04L 61/1511* (2013.01); *H04L 63/1466* (2013.01)

(58) Field of Classification Search
CPC ............... H04L 63/166; H04L 63/1466; H04L 61/1511; G06F 16/903; G06F 16/23
See application file for complete search history.

(56) References Cited

U.S. PATENT DOCUMENTS

| 9,537,899 | B2* | 1/2017 | Cox | H04L 63/205 |
| 10,225,237 | B2* | 3/2019 | Singh | H04L 67/02 |
| 2017/0171247 | A1* | 6/2017 | Sullivan | H04L 63/20 |
| 2017/0346853 | A1* | 11/2017 | Wyatt | G06F 21/56 |
| 2018/0109498 | A1* | 4/2018 | Singh | H04L 63/0281 |

FOREIGN PATENT DOCUMENTS

CN 106161453 A 11/2016

OTHER PUBLICATIONS

J. Damas, et al., "Extension Mechanisms for DNS (EDNS (0))", Internet Engineering Task Force (IETF), ISSN: 2070-1721, Apr. 2013, 16 pgs.
J. Hodges, et al., "HTTP Strict Transport Security (HSTS)", Internet Engineering Task Force (IETF), ISSN: 2070-1721, Nov. 2012, 46 pgs.
(Continued)

*Primary Examiner* — Hee K Song
(74) *Attorney, Agent, or Firm* — Edell, Shapiro & Finnan, LLC (57) ABSTRACT

In one example embodiment, a proxy server obtains, from a client, a query regarding a server with which the client is attempting to establish a communication session. Based on the query, the proxy server evaluates dynamically updated stored data to determine whether the dynamically updated stored data indicates that the server supports a secure transport protocol. Based on determining that the dynamically updated stored data indicates that the server supports the secure transport protocol, the proxy server provides a response to the client. The response causes the client to provide, to the server, an initial secure transport protocol message in the communication session.

20 Claims, 5 Drawing Sheets

(56) References Cited

OTHER PUBLICATIONS

Unknown author, "HTTPS encryption on the web", Google, Transparency Report, https://transparencyreport.google.com/https/overview, last accessed Apr. 16, 2018, 17 pgs.

Unknown author, "HTTPS:// Everywhere", Electronic Frontier Foundation, https://www.eff.org/https-everywhere, downloaded from the Internet Apr. 16, 2018, 6 pgs.

Unknown author, HSTS Preload List Submission, https://hstspreload.org/, downloaded from the Internet Apr. 16, 2018, 4 pgs.

Kupisiewicz, "DNS Extension to provide Default (Preferred) Protocol", draft-pkupisie-dnsop-dprot-00, Cisco Systems, Jan. 14, 2016, 6 pgs.

Unknown author, "How Cisco Umbrella Stops Command and Control Attacks", Mindsight, https://www.gomindsight.com/blog/how-cisco-umbrella-stops-command-and-control-attacks/, downloaded from the Internet Mar. 15, 2018, 8 pgs.

Hussain, et al., "Enc-DNS-HTTP: Utilising DNS Infrastructure to Secure Web Browsing", Hindawi, Security and Communication Networks, vol. 2016, Article ID 9479476, Wiley, https://www.hindawi.com/journals/scn/2017/9479476/, Apr. 3, 2017, 16 pgs.

Puangpronpitag, et al., "Simple and Lightweight HTTPS Enforcement to Protect Against SSL Striping Attack", IEEE, 2012 Fourth International Conference on Computational Intelligence, Communication Systems and Networks, Jul. 24, 2012, 6 pgs.

Sugavanesh B, et al., "SHS-HTTPS Enforcer: Enforcing HTTPS and preventing MITM Attacks", ACM SIGSOFT Software Engineering Notes, vol. 38 No. DOI: 10.1145/2532780.2532802, https://dl.acm.org/citation.cfm?doid=2532780.2532802, Nov. 2013, 4 pgs.

"HSTS Preload List", The Chromium Authors, 2012, last accessed Apr. 16, 2018, 1208 pgs.

\* cited by examiner

ENFORCING A SECURE TRANSPORT PROTOCOL WITH DYNAMICALLY UPDATED STORED DATA

TECHNICAL FIELD

The present disclosure relates to securing computer network communication sessions.

BACKGROUND

In a man-in-the-middle attack, an attacker secretly infiltrates a communication session between two parties. Unbeknownst to the two parties, the attacker may secretly monitor and possibly alter communications between the parties. This allows the attacker to, for example, obtain and exploit sensitive data (e.g., credit card information, confidential company emails, etc.). Secure communication protocols such as Hypertext Transfer Protocol Secure (HTTPS) have been developed to mitigate man-in-the-middle attacks.

DESCRIPTION OF EXAMPLE EMBODIMENTS

Overview

In one example embodiment, a proxy server obtains, from a client, a query regarding a server with which the client is attempting to establish a communication session. Based on the query, the proxy server evaluates dynamically updated stored data to determine whether the dynamically updated stored data indicates that the server supports a secure transport protocol. Based on determining that the dynamically updated stored data indicates that the server supports the secure transport protocol, the proxy server provides a response to the client. The response causes the client to provide, to the server, an initial secure transport protocol message in the communication session.

EXAMPLE EMBODIMENTS

Figure 1:
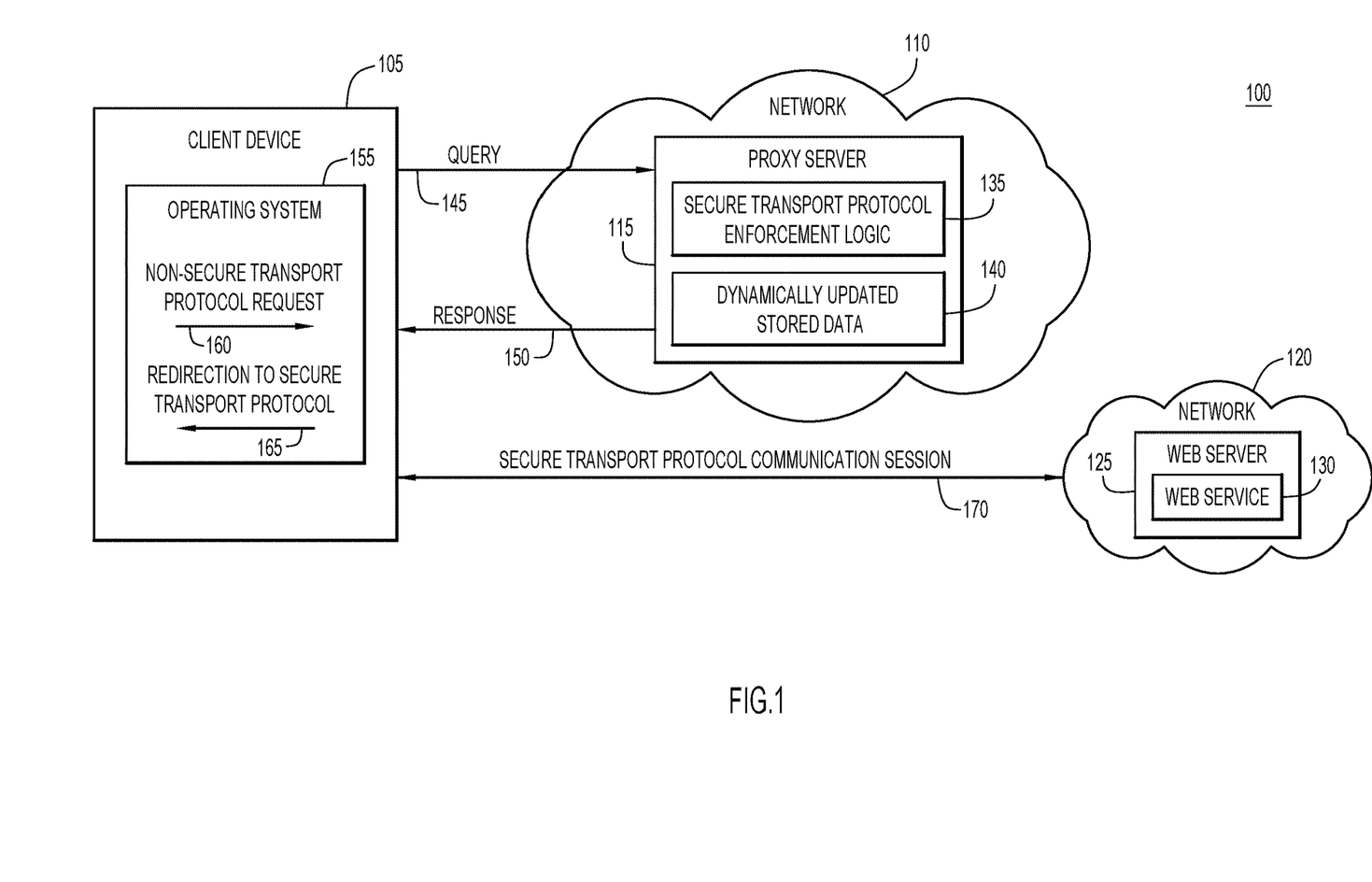
FIG. 1 illustrates a system configured for enforcing a secure transport protocol with dynamically updated stored data, according to an example embodiment.

With reference made to FIG. 1, shown is a system 100 configured for enforcing a secure transport protocol with dynamically updated stored data in accordance with examples presented herein. System 100 includes a client device 105, network 110 including proxy server 115, and network 120 including web server 125. In this example, client device 105 is attempting to establish a communication session with web server 125 in order to access web service 130 (e.g., a website) hosted by web server 125. Web server 125 is configured to support a secure communication protocol. The client device 105 may be a physical standalone device or it may be embodied by a software application running on an operating system on a device or on a server in a datacenter. For simplicity, the term "client" is meant to refer to any of these possible instantiations of a client device, or any instantiations hereinafter developed.

Conventionally, client device 105 would send a message to web server 125 using a non-secure communication protocol, thereby exposing client device 105 to a man-in-the-middle attack. Although there exist secure communication protocols to mitigate man-in-the-middle attacks, many web servers do not support such protocols. Even though web server 125 supports a secure communication protocol, client device 105 is not initially aware of this.

After receiving the initial non-secure message, the web server 125 would send a reply to the client device 105 indicating that the web server 125 supports the secure communication protocol. After receiving this indication, client device 105 would send subsequent messages to the web server 125 using the secure communication protocol. However, if an attacker had already instantiated a man-in-the-middle attack when the initial non-secure message was sent, the attacker could intercept the reply and prevent the indication from ever reaching the client device 105.

In one specific example of how a man-in-the-middle attacker can exploit conventional techniques, the client device 105 would send an initial Hypertext Transfer Protocol (HTTP) message to web server 125. Hypertext Transfer Protocol (HTTP) is an application protocol for communication over the Internet. Conventionally, the web server 125 would respond with an indication that the web server 125 supports HTTP Secure (HTTPS). HTTPS was developed as a secure extension of HTTP. HTTPS involves encrypting communications by a cryptographic protocol called Transport Layer Security (TLS), and formerly its predecessor, Secure Sockets Layer (SSL). This enables HTTPS to prevent interference by malicious attackers with a greater success rate than HTTP.

If the client device 105 received the indication that the web server 125 supports HTTPS, the client device 105 would send subsequent messages to the web server 125 using HTTPS. However, if a man-in-the-middle attacker were to intercept the response from the web server 125, the attacker may prevent the indication from reaching the client device 105. Since the client device 105 would not receive the indication that the web server 125 supports HTTPS, the client device 105 would continue sending HTTP messages to the web server 125. The man-in-the-middle attacker would intercept these HTTP messages, convert them to HTTPS messages, and forward the HTTPS messages to the web server 125. Meanwhile, the man-in-the-middle attacker would intercept HTTPS messages sent from the web server 125, convert them to HTTP messages, and forward the HTTP messages to the client device 105. Thus, the man-in-the-middle attacker would be able to monitor the communication session between the client device 105 and the web server 125 while remaining undetectable by either entity. This is known as an SSL strip attack.

HTTP Strict Transport Security (HSTS) is a standard developed to address SSL strip attacks. HSTS could be implemented as follows. After receiving the initial HTTP message from the client device 105, the web server 125 would send an HSTS response indicating that the client device 105 should use HTTPS in subsequent communications for some specified length of time (e.g., two million seconds), even for different communication sessions. The HSTS response includes an HSTS header that supplies the indication over an HTTPS payload. Thus, if the client device 105 ended that communication session and then began a new communication session within the specified length of time (e.g., one million seconds after receiving the HSTS response), the client device 105 would initiate the new communication session with an HTTPS message rather than an HTTP message.

However, HSTS does not address the initial HTTP message sent by the client device 105 during the first communication session. That is, if a man-in-the-middle attacker is monitoring the initial HTTP message, the attacker could prevent the client device 105 from receiving the HSTS message and carrying out a man-in-the-middle attack as described above (i.e., sending HTTP messages to the client device 105 and HTTPS messages to the web server 125).

In particular, the HSTS standard involves client devices ignoring HSTS headers over HTTP payloads due to security concerns associated with non-secure HTTP payloads. As such, an attacker could intercept the HSTS response, convert the HTTPS payload to HTTP, and forward the HTTP payload with the HSTS header to client device 105, thereby causing client device 105 to ignore the HSTS header and continue sending HTTP communications to the man-in-the-middle attacker. Therefore, HSTS does not address the situation in which a man-in-the-middle attacker intercepts the initial HTTP communication in the first communication session and prevents an HTTPS communication session from being securely established. This is known as the first connection problem, and has remained unsolved for many years.

One conventional solution to the first connection problem is to implement a static list identifying webpages for which the initial message should be an HTTPS message (as opposed to an HTTP message). The static list would be implemented on a browser of the client device 105 so that the client device 105 would know to send the initial message using HTTPS. However, the static list does not adequately address the first connection problem. For example, a static list is not scalable, as evidenced by the fact that the static list for one popular web browser is only 6.4 MB.

In addition, currently implemented static lists do not include a complete collection of webpages which should be HTTPS protected. For example, the static list for the aforementioned web browser does not include webpages for certain banks. Moreover, an administrator needs to request that a webpage be added to a static list, and this requires the administrator to know of the first connection problem as well as the existence of static lists which purport to address the first connection problem. Even if the administrator requests that a webpage be added to a static list, the browser vendor may not add the requested domain to the list because of, for example, size limitations of the static list.

As such, no mechanism currently exists that adequately addresses man-in-the-middle attacks for messages which are initially sent using a non-secure communication protocol (e.g., the first connection problem). Accordingly, proxy server 115 includes secure transport protocol enforcement logic 135 and dynamically updated stored data 140 to prevent such man-in-the-middle attacks. Briefly, before the client device 105 sends the initial communication to the web server 125, proxy server 115 determines that web server 125 supports a secure transport protocol and informs client device 105 as such. The client device 105 may then send an initial message to the web server 125 using the secure communication protocol, thereby proactively thwarting potential man-in-the-middle attacks.

The proxy server 115 may obtain (e.g., receive), from client device 105, a query 145 regarding web server 125. Based on the query, the proxy server 115 evaluates dynamically updated stored data 140 (e.g., a repository/database) to determine whether the dynamically updated stored data 140 indicates that the web server 125 supports a secure transport protocol (e.g., HTTPS). Based on determining that the dynamically updated stored data 140 indicates that the web server 125 supports the secure transport protocol, the proxy server 115 provides a response 150 to the client device 105. The response 150 causes the client device 105 to provide (e.g., send), to the web server 125, an initial secure transport protocol message in the communication session.

In one example, the proxy server 115 is a Domain Name System (DNS) server that provides secure DNS access and access control based on DNS queries. This is a convenient use case because client device 105 needs to send a DNS query to a DNS server (here, proxy server 115) in order to initiate a communication session with web server 125. Thus, a DNS query may be used to signal that a browser of the client device 105 will soon send an initial message to web server 125.

In this example, query 145 is a DNS query for an Internet Protocol (IP) address of the web server 125. Based on the query, the proxy server 115 fetches the HTTPS preference of the web server 125 from the dynamically updated stored data 140 and returns this information to client device 105 in the form of response 150. Here, response 150 is a DNS response including the IP address of the web server 125 as well as an indication that the web server 125 supports the secure transport protocol. The response 150 may provide this indication using any appropriate extension, such as DNS Extension to Provide Default (Preferred) Protocol (https://tools.ietf.org/html/draft-pkupisie-dnsop-dprot-00) or Extension Mechanisms for DNS (EDNS) (https://tools.ietf.org/html/rfc6891).

Upon receiving response 150, client device 105 may enforce the secure transport protocol at operating system 155. More specifically, the response 150 may cause operating system 155 to generate the initial secure transport protocol message by performing a redirection from a non-secure transport protocol (non-secure transport protocol request 160) to the secure transport protocol (redirection to secure transport protocol 165). Software in client device 105 may perform this redirection to enforce the secure transport protocol message and prohibit the non-secure transport protocol message for the domain(s) signaled in response 150. This software may be a small intermediate layer/application that redirects non-secure transport protocol request 160 from a browser on the client device 105 to the secure transport protocol.

Alternatively, instead of enforcing the secure transport layer at operating system 155, the client device 105 may enforce the secure transport protocol at the browser layer. In this example, the browser of the client device 105 may interpret the response 150 from the proxy server 115 and enforce the secure transport protocol accordingly. In either case (operating system or browser), the client device 105 may enforce the secure transport protocol locally, rather than based on any communications with the web server 125. This ensures that the initial message sent from the client device 105 to the web server 125 is a secure transport protocol message, thereby safely initiating secure transport protocol communication session 170 between client device 105 and web server 125.

Figure 2:
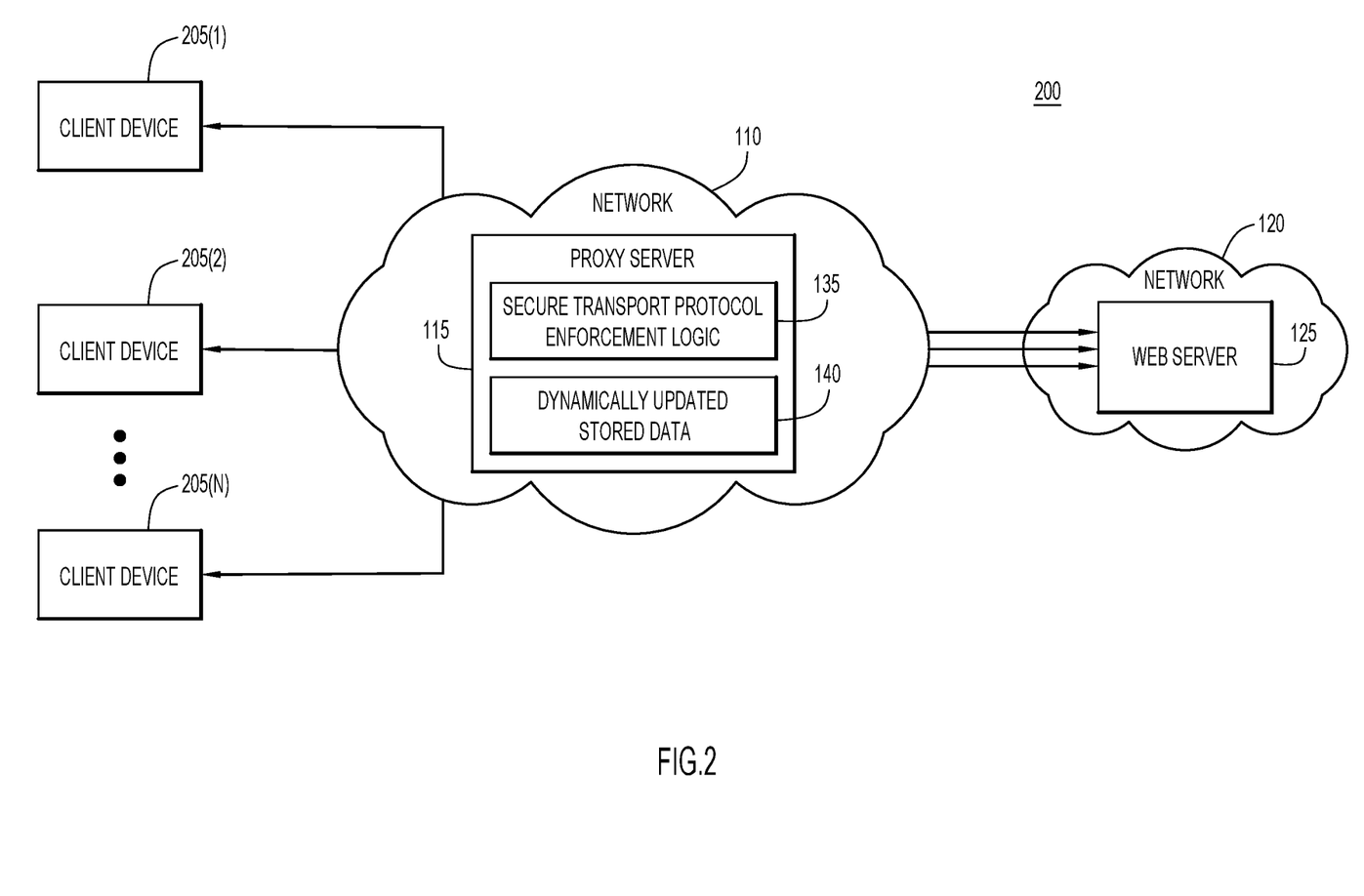
FIG. 2 illustrates a system configured for dynamically updating stored data for enforcing a secure transport protocol, according to an example embodiment.

FIG. 2 illustrates a system 200 configured for dynamically updating stored data 140. System 200 includes similar components as system 100, but further includes client devices 205(1)-205(N) instead of client device 105. The operations described in accordance with system 200 may occur before operations described above with reference to system 100. Briefly, the proxy server 115 may determine that the web server 125 supports the secure transport protocol and, in response, dynamically update the stored data 140 to indicate that the web server 125 supports the secure transport protocol. In other words, the proxy server 115 may build dynamically updated stored data 140 to later cause client device 105 to enforce the secure transport protocol in the initial message sent to the web server 125.

The proxy server 115 may determine that the web server 125 supports the secure transport protocol based on security headers in communications from web server 125 to client devices 205(1)-205(N). In one specific example, the proxy server 115 may passively monitor communications from the web server 125 to client devices 205(1)-205(N) for the security headers. The security headers may be, for example, HSTS headers which the proxy server 115 captures and saves to the dynamically updated stored data 140 during SSL decryption. Alternatively, if the SSL decryption is disabled for the proxy server 115, the proxy server 115 may actively provide a probe to the web server 125 and, in response to the probe, obtain a communication from the web server 125 that includes the security header. The probe may be, for example, an HTTPS message, and the response may be an HTTPS message with an HSTS header.

In another example, if no security headers are observed for the web server 125 (e.g., if web server 125 does not support HSTS), the proxy server 115 may passively monitor communications from the web server 125 to client devices 205(1)-205(N) for redirections from a non-secure transport protocol to a secure transport protocol. Such information may also be cached with dynamically updated stored data 140. The redirections may be, for example, 302 redirections from HTTP to HTTPS. If there are a sufficient number of redirections to the secure transport protocol from web server 125, the proxy server 115 may determine that subsequent messages from client devices that initialize communication sessions with web server 125 should be sent as secure transport protocol messages and dynamically update the dynamically updated stored data 140 accordingly. Because HSTS headers may be more reliable for this purpose than 302 redirections, the lifetime of an entry in the dynamically updated stored data 140 based on 302 redirections may be lower than entries based on HSTS headers.

Figure 3:
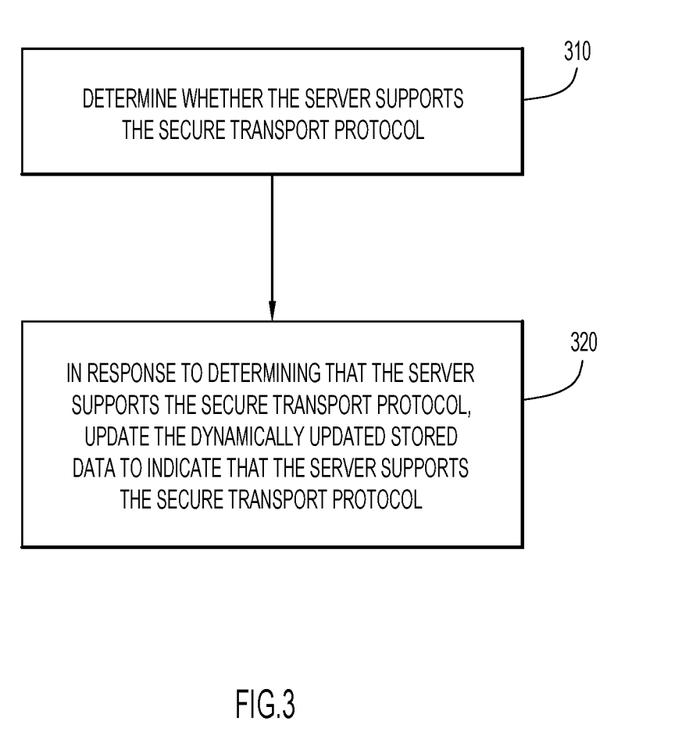
FIG. 3 illustrates a flowchart of a method for dynamically updating stored data for enforcing a secure transport protocol, according to an example embodiment.

FIG. 3 illustrates a flowchart of a method for dynamically updating dynamically updated stored data 140. At 310, proxy server 115 determines whether web server 125 supports the secure transport protocol. Proxy server 115 may make this determination by passively monitoring security headers, actively probing for security headers, or passively monitoring redirections from a non-secure transport protocol to a secure transport protocol. At 320, in response to determining that the web server 125 supports the secure transport protocol, the proxy server 115 may dynamically update the stored data 140 to indicate that the web server 125 supports the secure transport protocol.

Figure 4:
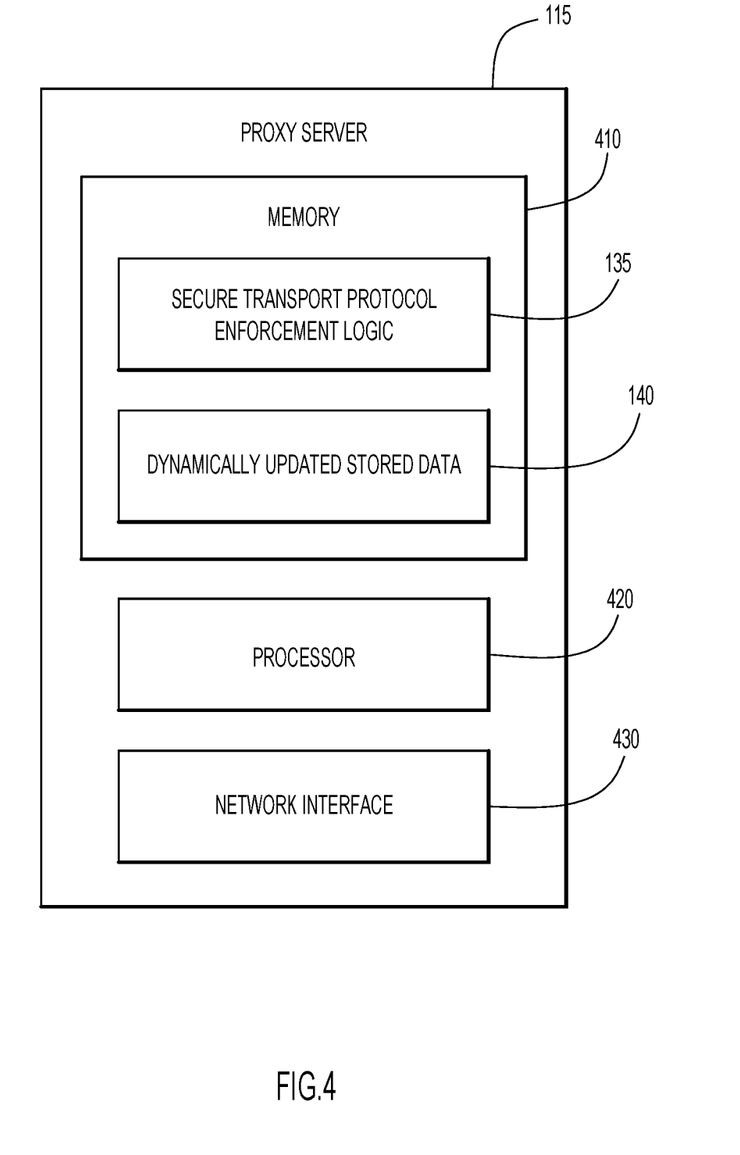
FIG. 4 illustrates a block diagram of a proxy server configured to enforce a secure transport protocol with dynamically updated stored data, according to an example embodiment.

FIG. 4 is a simplified block diagram of proxy server 115. In this example, the proxy server 115 includes a memory 410, one or more processors 420, and a network interface 430. Memory 410 stores instructions for the secure transport protocol enforcement logic 135 and also stores the dynamically updated stored data 140. The one or more processors 420 are configured to execute instructions stored in the memory 410 for the secure transport protocol enforcement logic 135. When executed by the one or more processors 420, the secure transport protocol enforcement logic 135 causes the proxy server 115 to perform operations described herein. The network interface 430 is a network interface card (or multiple instances of such a device) or other network interface device that enables network communications on behalf of the proxy server 115 for sending and receiving messages (e.g., query 145 and response 150) as described above.

The memory 410 may be read only memory (ROM), random access memory (RAM), magnetic disk storage media devices, optical storage media devices, flash memory devices, electrical, optical, or other physical/tangible memory storage devices. Thus, in general, the memory 410 may be one or more tangible (non-transitory) computer readable storage media (e.g., a memory device) encoded with software comprising computer executable instructions and when the software is executed (by the processor 420) it is operable to perform the operations described herein.

Figure 5:
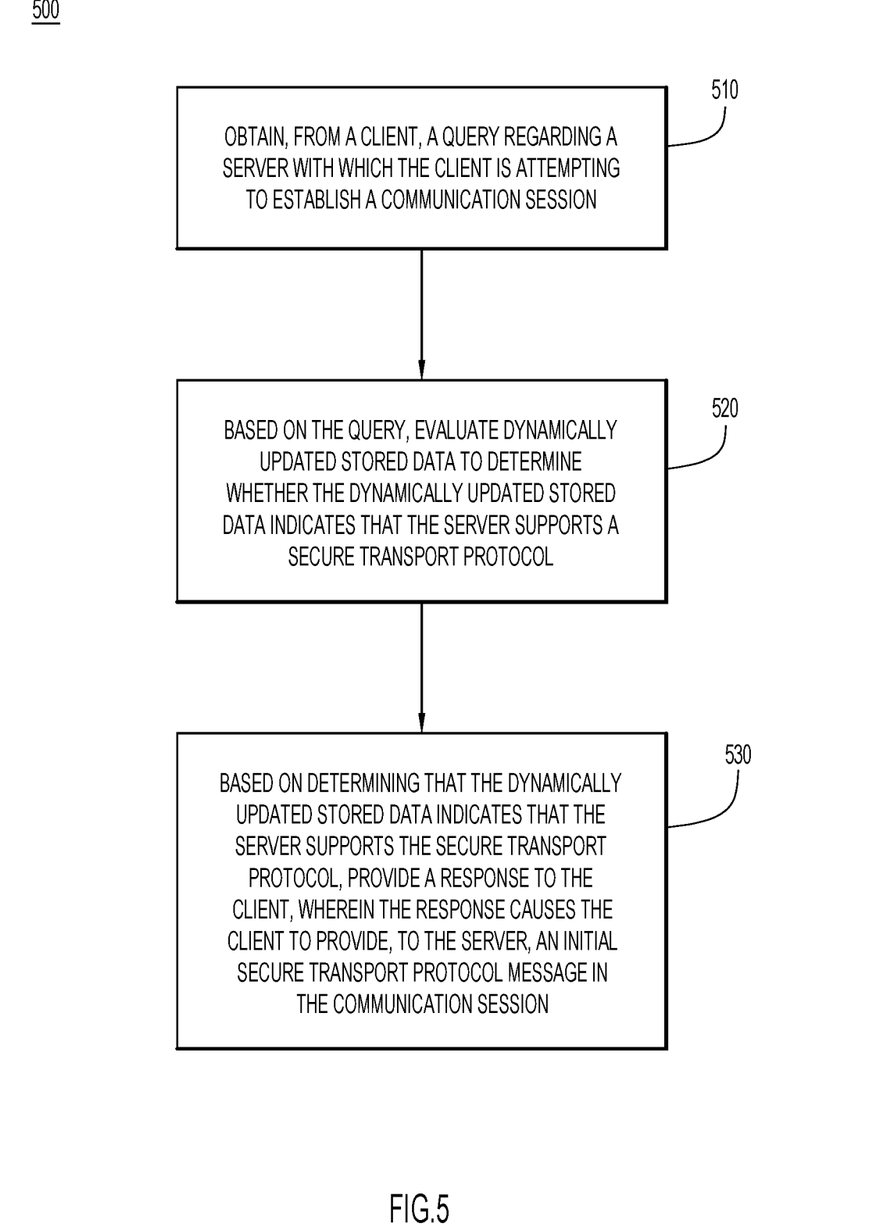
FIG. 5 illustrates a flowchart of a method for enforcing a secure transport protocol with dynamically updated stored data, according to an example embodiment.

FIG. 5 illustrates a flowchart of a method 500 in accordance with examples presented herein. In one example, a proxy server (e.g., proxy server 115) performs method 500. At 510, the proxy server obtains, from a client, a query regarding a server with which the client is attempting to establish a communication session. At 520, based on the query, the proxy server evaluates dynamically updated stored data to determine whether the dynamically updated stored data indicates that the server supports a secure transport protocol. At 530, based on determining that the dynamically updated stored data indicates that the server supports the secure transport protocol, the proxy server provides a response to the client, wherein the response causes the client to provide, to the server, an initial secure transport protocol message in the communication session.

Techniques described herein include intelligently detecting that a webpage is to use only HTTPS communications. This may be accomplished by recognizing HSTS-enabled sites or by detecting HTTP to HTTPS redirections for servers not supporting HSTS. These techniques may be implemented in a plurality of proxy servers each servicing large numbers of users. By monitoring traffic from thousands of client devices, the plurality of proxy servers may dynamically update stored data reliably. Proxy servers may communicate with each other or with a centralized server to dynamically update or obtain dynamically updated stored data.

The dynamically updated stored data may be an HTTPS-only database that includes information regarding the HTTPS preference of one or more domains. This dynamically built HTTPS-only database minimizes potential man-in-the-middle and SSL strip attacks by addressing the first connection problem, thereby dramatically improving security of services in the Internet. These techniques may be implemented in enterprise or home environments.

The mechanisms described herein may include enforcing HTTPS on the client operating system based on a DNS response, which may in turn be based on the dynamically created HTTPS-only database. The HTTPS-only database may be created by passively (e.g., SSL decryption) or actively (e.g., explicit probe) monitoring HSTS headers. The HTTPS-only database may also be created by passively observing HTTP to HTTPS redirections for multiple client devices. This scale effect may help avoid man-in-the-middle attacks. Since the database may be populated automatically by passively examining HSTS headers and 302 redirections, no manual rules or administrator action is required.

In one form, a method is provided. The method comprises: obtaining, from a client, a query regarding a server with which the client is attempting to establish a communication session; based on the query, evaluating dynamically updated stored data to determine whether the dynamically updated stored data indicates that the server supports a secure transport protocol; and based on determining that the dynamically updated stored data indicates that the server supports the secure transport protocol, providing a response to the client, wherein the response causes the client to provide, to the server, an initial secure transport protocol message in the communication session.

The method may further comprise: before obtaining the query, determining whether the server supports the secure transport protocol; and in response to determining that the server supports the secure transport protocol, updating the (dynamically updated) stored data to indicate that the server supports the secure transport protocol for use by the evaluating. In a first example, determining that the server supports the secure transport protocol includes passively monitoring communications to one or more clients from the server for redirections from a non-secure transport protocol to the secure transport protocol. In a second example, determining that the server supports the secure transport protocol includes passively monitoring communications to one or more clients from the server for security headers. In a third example, determining that the server supports the secure transport protocol includes: actively providing a probe to the server; and obtaining a communication from the server that is responsive to the probe, the communication including a security header.

In one example, the response causes an operating system of the client to generate the initial secure transport protocol message by performing a redirection from a non-secure transport protocol to the secure transport protocol. In another example, the response causes a browser of the client to generate the initial secure transport protocol message. Obtaining the query may include obtaining a DNS query for an IP address of the server; and providing the response may include providing a DNS response including an indication that the server supports the secure transport protocol. The secure transport protocol may be HTTPS.

In another form, an apparatus is provided. The apparatus comprises: a memory configured to store dynamically updated data; a network interface configured to enable network communications; and one or more processors in communication with the memory and the network interface, wherein the one or more processors are configured to: obtain, from a client and via the network interface, a query regarding a server with which the client is attempting to establish a communication session; based on the query, evaluate the dynamically updated data to determine whether the dynamically updated data indicates that the server supports a secure transport protocol; and based on determining that the dynamically updated data indicates that the server supports the secure transport protocol, provide, via the network interface, a response to the client, wherein the response causes the client to provide, to the server, an initial secure transport protocol message in the communication session.

In another form, one or more non-transitory computer readable storage media are provided. The non-transitory computer readable storage media are encoded with instructions that, when executed by a processor, cause the processor to: obtain, from a client, a query regarding a server with which the client is attempting to establish a communication session; based on the query, evaluate dynamically updated stored data to determine whether the dynamically updated stored data indicates that the server supports a secure transport protocol; and based on determining that the dynamically updated stored data indicates that the server supports the secure transport protocol, provide a response to the client, wherein the response causes the client to provide, to the server, an initial secure transport protocol message in the communication session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining whether a server supports a secure transport protocol by passively monitoring communications to one or more clients from the server for redirections from a non-secure transport protocol to the secure transport protocol;
   in response to determining that the server supports the secure transport protocol, dynamically updating stored data to indicate that the server supports the secure transport protocol;
   obtaining a query regarding the server from a client that is attempting to establish a communication session with the server;
   based on the query, evaluating the stored data to determine whether the stored data indicates that the server supports the secure transport protocol; and
   in response to determining that the stored data indicates that the server supports the secure transport protocol, providing a response to the client, wherein the response causes the client to provide, to the server, an initial secure transport protocol message in the communication session.

2. The method of claim 1, wherein determining whether the server supports the secure transport protocol further includes passively monitoring the communications to the one or more clients from the server for security headers.

3. The method of claim 1, wherein determining whether the server supports the secure transport protocol further includes:
   actively providing a probe to the server; and
   obtaining a communication from the server that is responsive to the probe, the communication including a security header.

4. The method of claim 1, wherein the response causes an operating system of the client to generate the initial secure transport protocol message.

5. The method of claim 1, wherein the response causes a browser of the client to generate the initial secure transport protocol message.

6. The method of claim 1, wherein:
   obtaining the query includes obtaining a Domain Name System (DNS) query for an Internet Protocol address of the server; and
   providing the response includes providing a DNS response including an indication that the server supports the secure transport protocol.

7. The method of claim 1, wherein the secure transport protocol is Hypertext Transfer Protocol Secure (HTTPS).

8. An apparatus comprising:
   a network interface configured to enable network communications; and one or more processors in communication with the network interface, wherein the one or more processors are configured to:
  determine whether a server supports a secure transport protocol by passively monitoring communications to one or more clients from the server for security headers;
  in response to determining that the server supports the secure transport protocol, dynamically update stored data to indicate that the server supports the secure transport protocol;
  obtain a query regarding the server from a client that is attempting to establish a communication session with the server;
  based on the query, evaluate the stored data to determine whether the stored data indicates that the server supports the secure transport protocol; and
  in response to determining that the stored data indicates that the server supports the secure transport protocol, provide a response to the client, wherein the response causes the client to provide, to the server, an initial secure transport protocol message in the communication session.

9. The apparatus of claim 8, wherein the one or more processors are further configured to determine whether the server supports the secure transport protocol by passively monitoring the communications to the one or more clients from the server for redirections from a non-secure transport protocol to the secure transport protocol.

10. The apparatus of claim 8, wherein the one or more processors are further configured to determine whether the server supports the secure transport protocol by:
  actively providing, via the network interface, a probe to the server; and
  obtaining a communication from the server that is responsive to the probe, the communication including a security header.

11. The apparatus of claim 8, wherein the response causes an operating system of the client to generate the initial secure transport protocol message.

12. The apparatus of claim 8, wherein the response causes a browser of the client to generate the initial secure transport protocol message.

13. The apparatus of claim 8, wherein the one or more processors are configured to:
  obtain the query by obtaining a Domain Name System (DNS) query for an Internet Protocol address of the server; and
  provide the response by providing a DNS response including an indication that the server supports the secure transport protocol.

14. The apparatus of claim 8, wherein the secure transport protocol is Hypertext Transfer Protocol Secure (HTTPS).

15. One or more non-transitory computer readable storage media encoded with instructions that, when executed by a processor, cause the processor to:
  determine whether a server supports a secure transport protocol by actively providing a probe to the server and obtaining a communication from the server that is responsive to the probe, the communication including a security header;
  in response to determining that the server supports the secure transport protocol, dynamically update stored data to indicate that the server supports the secure transport protocol;
  obtain a query regarding the server from a client that is attempting to establish a communication session with the server;
  based on the query, evaluate the stored data to determine whether the stored data indicates that the server supports the secure transport protocol; and
  in response to determining that the stored data indicates that the server supports the secure transport protocol, provide a response to the client, wherein the response causes the client to provide, to the server, an initial secure transport protocol message in the communication session.

16. The one or more non-transitory computer readable storage media of claim 15, wherein the response causes an operating system of the client to generate the initial secure transport protocol message.

17. The one or more non-transitory computer readable storage media of claim 15, wherein the response causes a browser of the client to generate the initial secure transport protocol message.

18. The one or more non-transitory computer readable storage media of claim 15, wherein the instructions further cause the processor to:
  determine whether the server supports the secure transport protocol further by passively monitoring communications to one or more clients from the server for redirections from a non-secure transport protocol to the secure transport protocol.

19. The one or more non-transitory computer readable storage media of claim 15, wherein the instructions further cause the processor to:
  determine whether the server supports the secure transport protocol further by passively monitoring communications to one or more clients from the server for security headers.

20. The one or more non-transitory computer readable storage media of claim 15, wherein the instructions cause the processor to:
  obtain the query by obtaining a Domain Name System (DNS) query for an Internet Protocol address of the server; and
  provide the response by providing a DNS response including an indication that the server supports the secure transport protocol.

* * * * *